(12) United States Patent
Olsson et al.

(10) Patent No.: US 6,921,211 B2
(45) Date of Patent: Jul. 26, 2005

(54) BEARING HOUSING AND SEAL ASSEMBLY IN SUCH A BEARING HOUSING

(75) Inventors: Henrik Olsson, Katrineholm (SE); Jörgen Stendahl, Vingåker (SE); Kjell Clasborn, Katrineholm (SE)

(73) Assignee: Aktiebolaget SKF, Gothenburg (SE)

( * ) Notice: Subject to any disclaimer, the term of this patent is extended or adjusted under 35 U.S.C. 154(b) by 54 days.

(21) Appl. No.: 10/650,696

(22) Filed: Aug. 29, 2003

(65) Prior Publication Data
US 2004/0066996 A1 Apr. 8, 2004

(30) Foreign Application Priority Data
Aug. 30, 2002 (SE) .............................. 0202569

(51) Int. Cl.⁷ ............................ F16C 33/66; F16C 35/00
(52) U.S. Cl. .................................... 384/480; 384/472
(58) Field of Search ................................ 384/480, 406, 384/472, 465

(56) References Cited

U.S. PATENT DOCUMENTS

| | | | | |
|---|---|---|---|---|
| 4,619,535 A | * | 10/1986 | Haugwitz ................ | 384/472 |
| 4,978,236 A | * | 12/1990 | Ostling .................... | 384/480 |
| 5,494,173 A | * | 2/1996 | Deister et al. ............. | 384/480 |
| 5,655,845 A | * | 8/1997 | Lampart ................... | 384/480 |
| 5,833,372 A | * | 11/1998 | Nisley ..................... | 384/477 |

* cited by examiner

Primary Examiner—Thomas R. Hannon
(74) Attorney, Agent, or Firm—Burns Doane Swecker & Mathis LLP

(57) ABSTRACT

An oil ring lubricated split bearing housing includes upper and lower bearing housing halves having mating seat surfaces for a bearing which is adapted to support a shaft, an oil reservoir space in the lower housing half, an oil pick up ring partly immersed in the oil reservoir space and rotatable to transfer oil from space to the bearing, an inner labyrinth sealing sleeve fixedly fitted around the shaft and having a circumferential axial groove facing away from the bearing, and an outer labyrinth sealing part with a portion projecting axially into the axial groove thereby forming a labyrinth seal. Both bearing housing halves have gable openings closely fitting around the sleeve. The outer labyrinth sealing part being in the form of a ring having an axially projecting portion entering in the axial groove and another portion retained in a radial, circumferential groove in the upper bearing housing half.

19 Claims, 4 Drawing Sheets

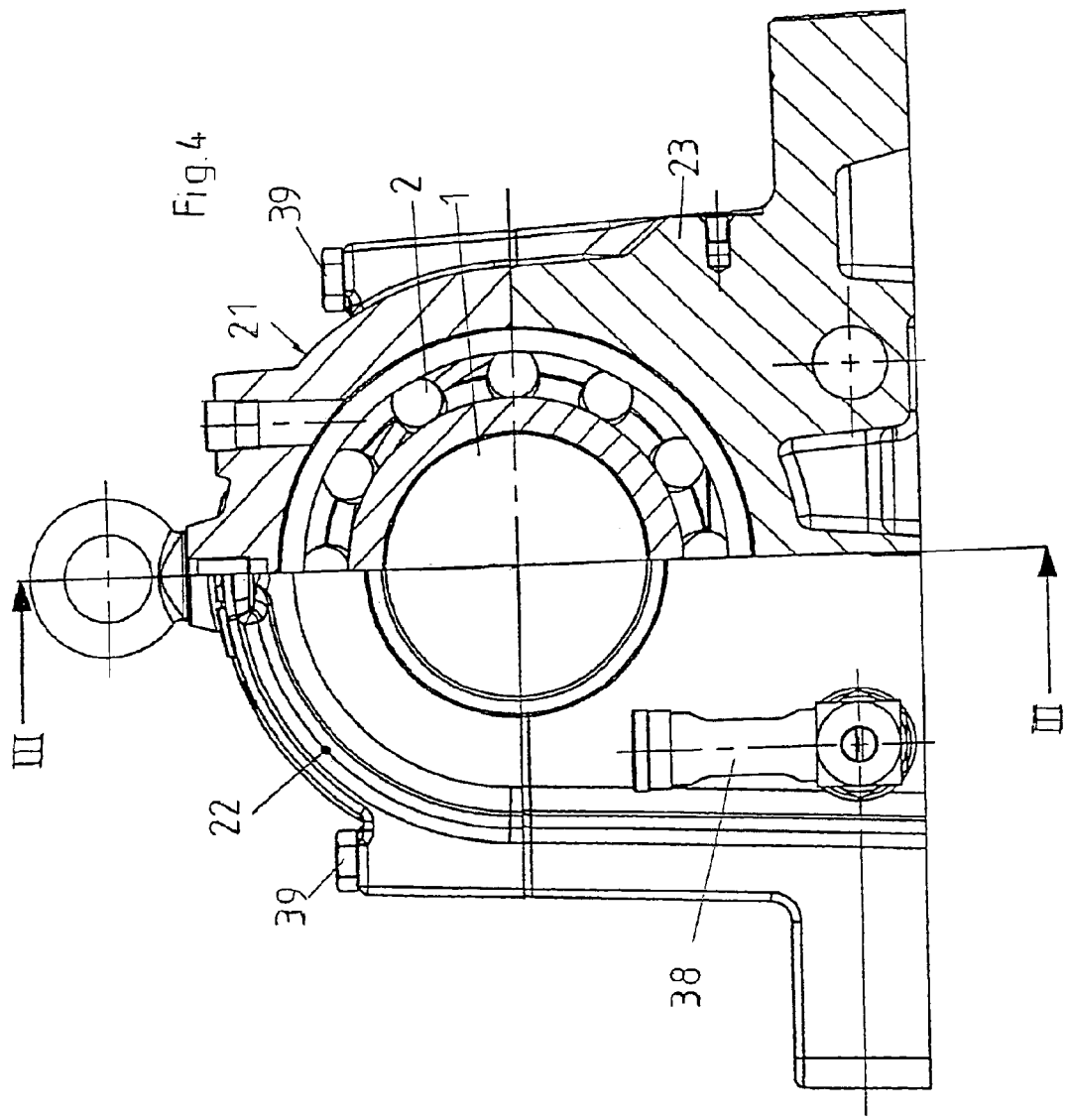

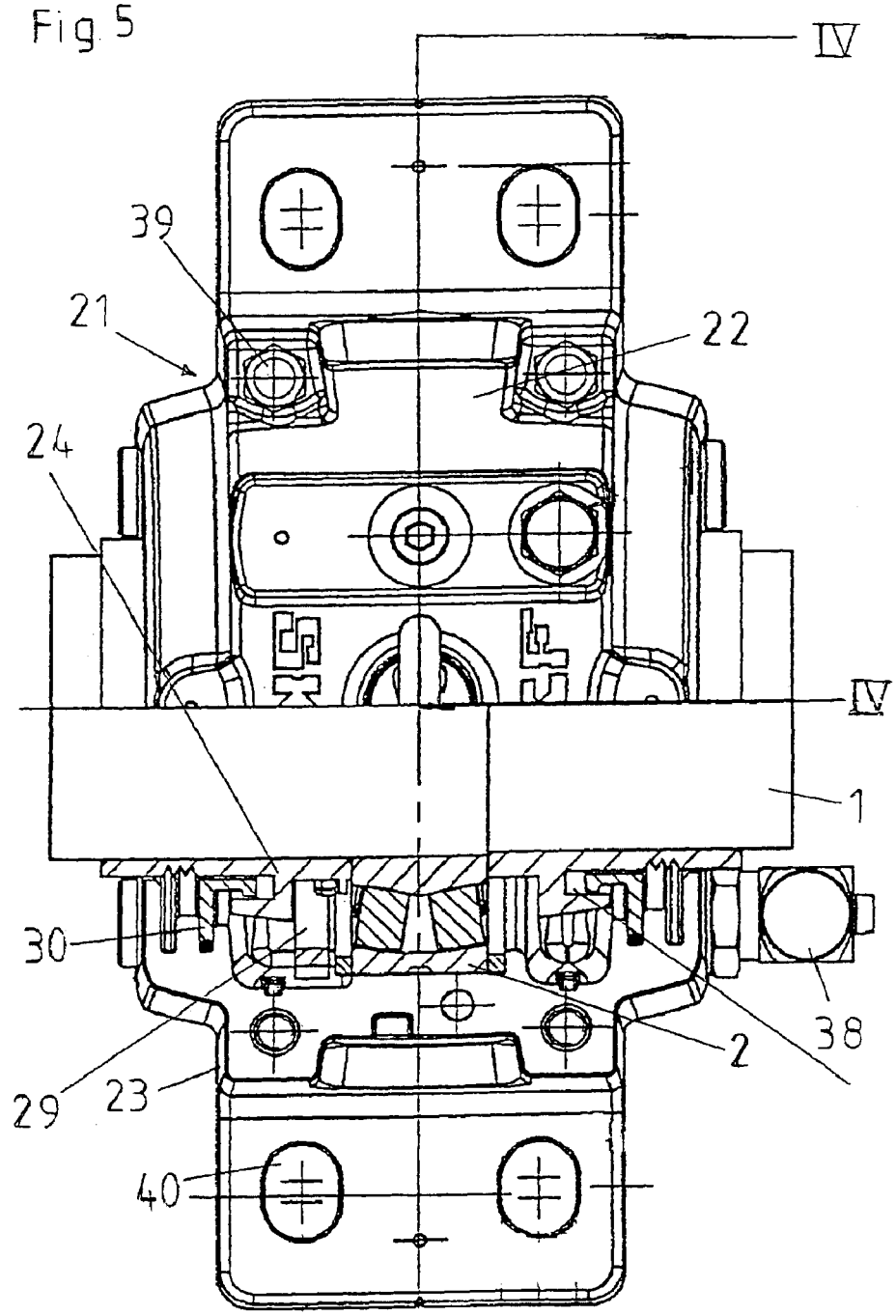

BEARING HOUSING AND SEAL ASSEMBLY IN SUCH A BEARING HOUSING

This application is based on and claims priority under 35 U.S.C. § 119 with respect to Swedish Application No. 0202569-0 filed on Aug. 30, 2002, the entire content of which is incorporated herein by reference.

FIELD OF THE INVENTION

The present invention generally relates to a bearing housing and a seal assembly in a bearing housing. More particularly, the present invention pertains to a split bearing housing having oil ring lubrication and a labyrinth seal for use for preventing oil from leaking out of the bearing housing.

BACKGROUND OF THE INVENTION

FIG. 1 illustrates in cross-section a known bearing housing manufactured by SKF Mekan AB and referred to as a SOFN bearing housing for use with oil ring lubricated bearings and FIG. 2 illustrates in a perspective side view the bearing housing shown in FIG. 1. The upper half of FIG. 1 shows the housing with a shaft extending through the housing, whereas the lower half of the drawing shows the housing with a shaft projecting only from the left hand side of the bearing housing.

The bearing housing supports a shaft 1 in a rolling bearing which, in the embodiment shown, is a spherical roller bearing. The bearing housing is split along a substantially horizontal line so that the housing has a lower half 3 and an upper half 4, which are interconnected by bolts. In the lower part of the housing there is a space 5 used as a reservoir for oil. An oil transport ring 6 to be partly immersed is arranged in this space 5. This oil transport ring 6 picks up oil from the reservoir space 5 and lets the oil be thrown off above this space when rotating with the shaft, thereby throwing oil into the bearing surfaces to be lubricated. The lower half 3 of the bearing housing shown in FIG. 1 has a central upwardly projecting, semicircular flange 7 forming the lower half of the seat for the outer ring of the bearing. The inner envelope or peripheral surface of the upper bearing half 4 forms the other half of the bearing seat. The two bearing seat halves thereby form a large-diameter, substantially cylindrical opening through the bearing housing. Due to the positioning of the oil reservoir space 5, this bearing housing is not symmetrical about the axis of the shall 1. In the embodiment shown, the bearing 2 has a taper bore and is mounted on the shaft on a taper sleeve 8.

A lock nut 9 is provided at one side of the bearing for securing the bearing against movement in the axial direction. In case the shaft is not projecting outside the housing on that side, as shown in the lower part of FIG. 1, a disc-shaped end lid 10 is fitted by bolts to the upper and lower bearing housing halves 3, 4. As the end lid 10 also covers and forms a side wall of the oil reservoir space 5, it is of course vital that the lid is securely sealed off at 10a for preventing leakage from the oil reservoir.

On the side of the bearing 2 where the shaft 1 extends out of the bearing housing, i.e. in the upper half of FIG. 1 at both sides of the bearing, a sleeve 11 is mounted around the shaft 1, and each sleeve is fixedly mounted and secured by means of a set screw 12. At its side which is turned towards the bearing, the sleeve 11 is provided with a radially extending flange 13, which at a distance from the sleeve surface has an axially outwardly extending edge 14. A circumferential axial groove 15 is thus provided with its open side facing outwardly away from the bearing.

The side of the housing through which the shaft 1 extends is fitted with an end cover 16. The end cover 16 has an inner envelope or peripheral surface closely fitting around the sleeve 11 and an axially extending shoulder 17 positioned and dimensioned to fit into the groove 15 when the end cover 16 is mounted axially. The inevitable, small slot between the inner envelope surface of the end cover 16 and the outer envelope or peripheral surface of the sleeve 11, and the small spaces between the walls of the groove 15 and the shoulder 17 form together a labyrinth seal which prevents the oil in the bearing housing from leaking out along the shaft, when this oil due to the action of the oil ring 6, splashes around in the housing.

To avoid leakage beyond the labyrinth seal from reaching the outside of the bearing housing, the outer envelope or peripheral surface of the sleeve 11 is provided with a number of circumferential notches 18, positioned between the axially outer side of the end cover 16 and the outwardly extending edge 14 thereof. These notches 18 are positioned at a channel 19 returning any oil which appears there to the oil reservoir space 5.

It can be appreciated that the arrangement with the end cover 16 and an integrated portion thereof forming a part of the labyrinth seal means that the mounting of the bearing housing, particularly at the circled area in FIG. 1, is an operation which must be carried out very carefully.

From FIG. 2, which shows the exterior of the bearing housing illustrated in FIG. 1, it can be seen that the bearing housing has a large number of components. and in particular a large number of bolts 20 for attaching the end lid 10 and/or the end covers 16. In the illustrated embodiment, 9 bolts for each lid or cover are required. The large number of components and the extensive work required for mounting and dismounting at any subsequent maintenance operation means that this known housing is rather expensive and requires a relatively long mounting and dismounting time.

SUMMARY OF THE INVENTION

The present invention provides a split bearing housing adapted for oil-ring lubrication and having a labyrinth seal for preventing oil leakage which has a substantially lower number of components and requires a lesser number of mounting steps than the above described bearing housing, thus making the new bearing housing less expensive and significantly easier to assemble.

According to one aspect of the invention, a bearing housing is split along a substantially horizontal plane and comprises an upper bearing housing half and a lower bearing housing half which have seat surfaces carrying a rolling bearing supporting a rotatable shaft. An oil reservoir space is located in the lower bearing housing half and an oil pick up ring straddles the shaft so as to be partly located in the oil reservoir space and is rotatable under influence of the rotatable shaft to transfer oil from the oil reservoir space to the bearing. An inner labyrinth sealing ring is formed as a sleeve which is fitted around the shaft to follow rotation of the shaft. The sleeve is axially spaced apart from the bearing and forms a circumferential axial groove having an open side facing away from the bearing. An outer labyrinth sealing part is comprised of a ring member separate from the upper bearing housing half and the lower bearing housing half. This ring member has a first portion projecting axially into the axial groove to form a labyrinth seal with the axial groove and a second portion retained in a substantially radial circumferential groove formed in the inner surface of the upper bearing housing half. The upper bearing housing half and the lower bearing housing half both having gable wall openings fitting around the sleeve.

According to another aspect, a bearing housing is comprised of upper and lower bearing housing halves which mate with each other along a substantially horizontal parting plane, with the upper and lower housing halves carrying a rolling bearing which supports a rotatable shaft. An oil reservoir space is located in the lower bearing housing half, and an oil pick up ring is at least partly located in the oil reservoir space and is rotatable under influence of the shaft to transfer oil from the oil reservoir space to the bearing. A sleeve is fitted around the shaft and is configured to define a circumferential groove which opens axially in a direction away from the bearing. The upper and lower bearing housing halves each comprise side walls integrally formed in one piece with the respective upper and lower bearing housing half and fitted around the sleeve. A ring member separate from the upper and lower bearing housing halves has a portion projecting into the circumferential groove to form a labyrinth seal with the circumferential groove.

BRIEF DESCRIPTION OF THE DRAWING FIGURES

The foregoing and additional features and characteristics of a preferred form of the present invention will become more apparent from the following detailed description considered with reference to the accompanying drawing figures in which like reference numerals designate like elements.

FIG. 4 is a side view of the bearing housing according to the invention, wherein the right hand half of the bearing housing is shown in cross section taken along the section line IV—IV in FIG. 5.

FIG. 5 is a top view of the bearing housing according to the invention, wherein one-half of the bearing housing is shown in cross-section.

DETAILED DESCRIPTION

Figure 3:
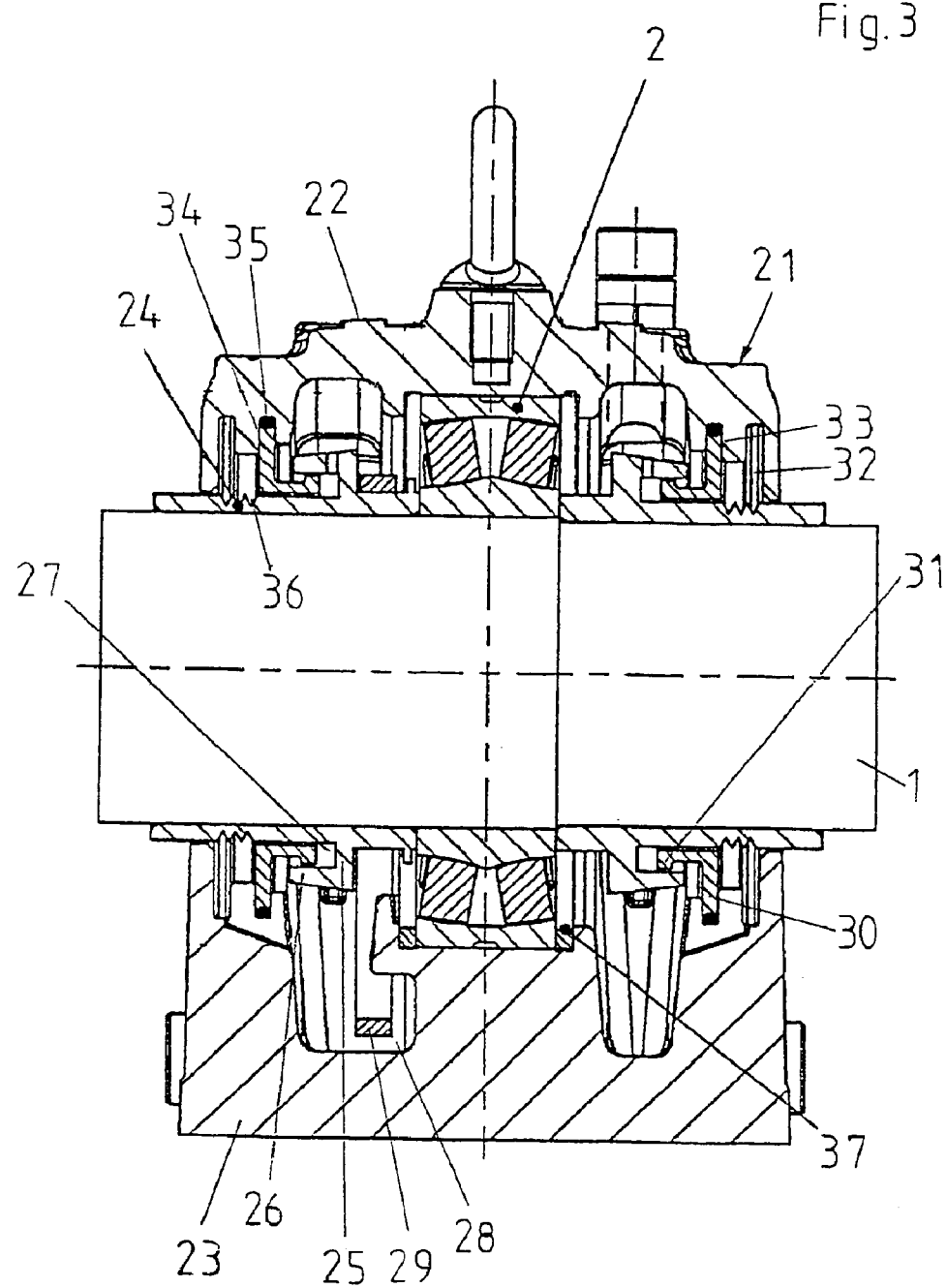
FIG. 3 is a cross-sectional view taken along the section line III—III in FIG. 4 of a bearing housing for use with oil ring lubricated bearings according to one embodiment of the invention.

Referring to FIG. 3, a shaft us supported in a bearing housing 21 by way of a spherical roller bearing 2. The bearing housing 21 has an upper half 22 and a lower half 23 forming together an internal, cylindrical seat for the outer ring of the bearing. In addition, an inner sleeve 24 is fitted around the shaft 1. This inner sleeve 24 has a radially outwardly extending circumferential flange 25 which, at a distance from the sleeve surface, has an axially outwardly extending edge 26. A circumferential axial groove 27 is thus formed and has an open side facing outwardly away from the bearing, thereby forming an inner labyrinth sealing ring which thus in the embodiment illustrated is made integral with the sleeve 24. A space 28 is arranged in the lower half 23 of the bearing housing and acts as an oil reservoir in which is immersed an oil pick-up ring 29. The oil pick-up ring 29 is arranged to rotate when the shaft rotates in the bearing, thereby continuously lifting oil from the reservoir 28 and splashing it into the bearing 2.

To prevent the oil from leaking out of the housing through the side openings at which the shaft 1 passes, an outer labyrinth sealing part or second sealing part 30 is provided. In the illustrated embodiment, the outer labyrinth sealing part 30 is in the form of a separate ring or outer labyrinth ring 30 having a substantially L-shaped cross-section. The L-shaped cross-section of the outer labyrinth ring 30 comprises, in the mounted position, an axially extending shank portion 31 projecting into the circumferential axial groove 27 in the first labyrinth ring, thereby forming a labyrinth seal. The outer labyrinth ring 30 is thus arranged to form together with the rotating outer peripheral surface of the sleeve 24 a very thin slot as the sleeve rotates together with the shaft.

Figure 1:
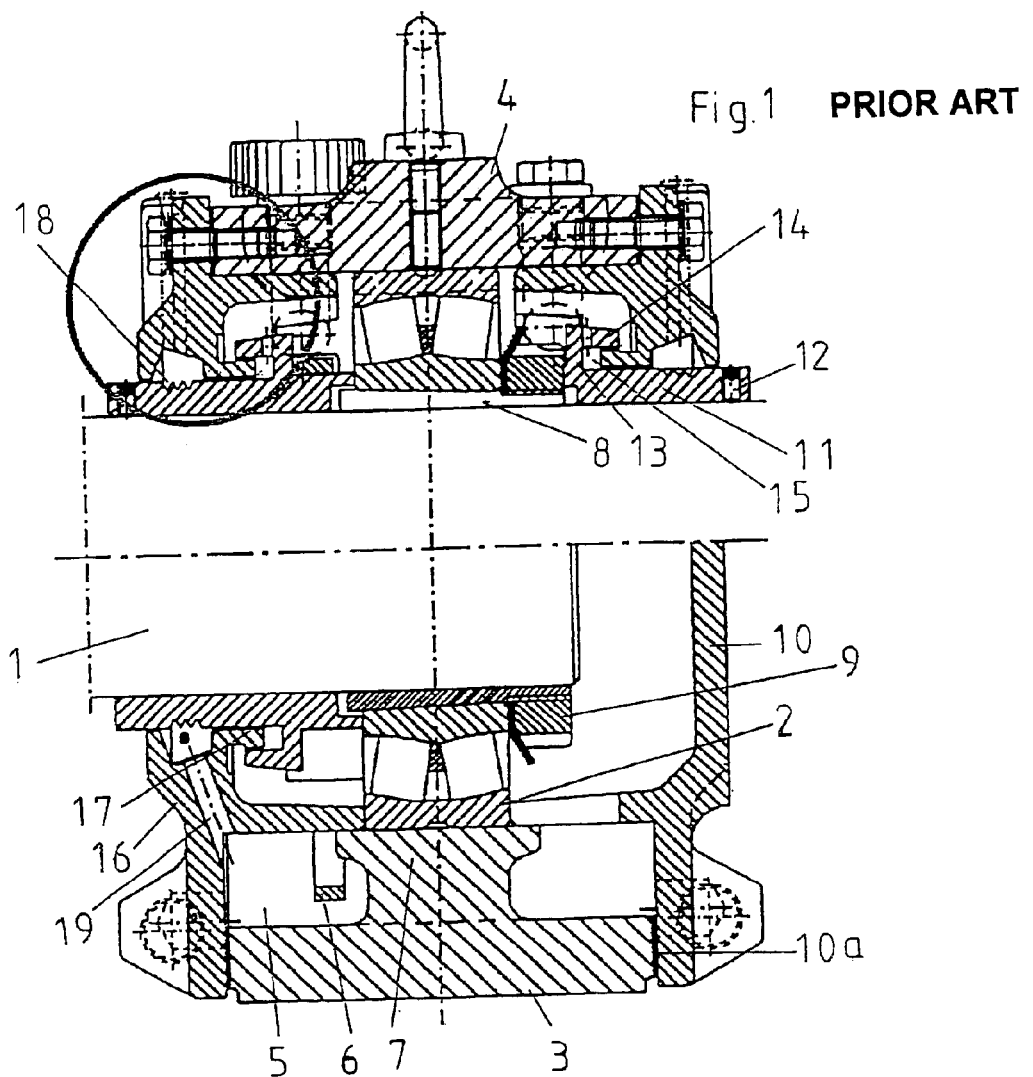
FIG. 1 is a cross-sectional view of a known bearing housing for use with oil ring lubricated bearings.
Figure 2:
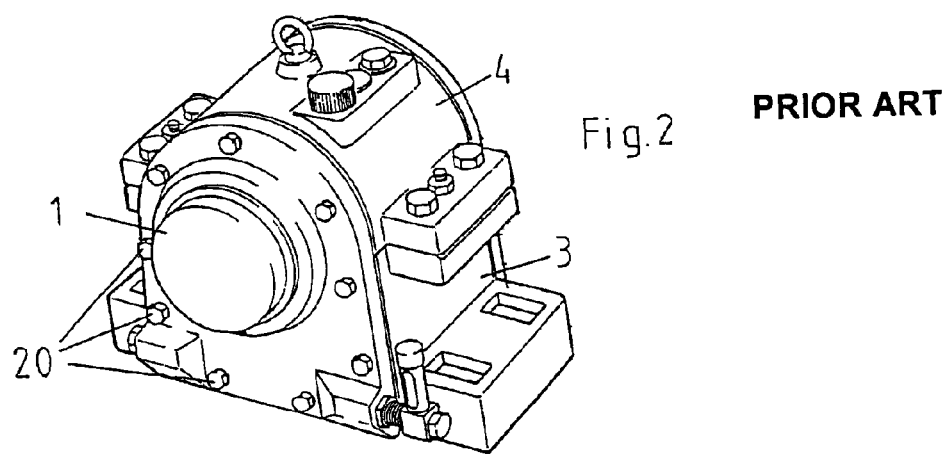
FIG. 2 is a perspective side view of the bearing housing shown in FIG. 1.

The upper and the lower halves 22, 23 of the bearing housing differ from those shown in FIGS. 1 and 2 in that they have side walls or side gables arranged to fit closely around the sleeve 24 so that only a very small slot exists between the gable opening and the sleeve surface. The side walls or side gables are integrally formed in one piece with the respective bearing housing half as shown in FIG. 3. In the inner surface of the upper bearing housing half 22 near each one of the gable opening, a first and a second circumferential groove 32, 33, respectively are formed. The outer one of these grooves 32 is intended to take up an end cover in case the bearing housing is used to support a shaft end.

Positioned in the second groove 33, which is axially spaced apart from the first outer groove 32, is another portion 34 of the L-shaped ring 30 which, in the illustrated embodiment, is a radially extending shank 34 of the L-shaped ring 30. A resilient member 35 is positioned around the radial shank 34 of the outer or second labyrinth ring and acts to sealingly press against the bottom of the second groove 33 when the shank 34 is mounted in the groove 35. In the illustrated embodiment of the bearing housing, the resilient member 35 is in the form of an elastic O-ring seal 35.

The sleeve 24 is provided with a surface formation(s) 36 which, when the assembly has been mounted, is situated between the two grooves 32, 33 in the upper bearing housing half 22. In the illustrated embodiment, the surface formation (s) 36 is in the form of a grooved portion 36. The grooves 32, 33 continue along a part of the wall of the lower bearing housing half 23, thereby giving an end cover in the first outer groove 32 and the radial shank 34 of the second labyrinth ring 30 better guidance. The grooved portion 36 of the sleeve 24 will drain any oil, which might pass the labyrinth seal, to the oil reservoir 28.

In the upper part of the bearing housing shown in FIG. 3, the bearing is arranged as a non-locating bearing, whereas the lower part shows an arrangement where the bearing is a locating bearing, which is achieved by positioning a spacing ring 37 between each side of the bearing 2 and an adjacent shoulder in the bearing housing.

Referring to FIG. 4, the left hand side of the illustrated bearing housing is shown in a planar side view whereas the right hand side is shown in cross-section as viewed along the section line IV—IV in FIG. 5. FIG. 4 shows the bearing housing 21 with its upper and lower halves 22, 23 respectively, in which the bearing 2 supporting the shaft 1 is arranged. The left hand side of FIG. 4 illustrates an oil level gauge 38 on which can be read off the current oil level in the internal oil reservoir 28 shown in FIG. 3. From the FIG. 3 illustration, it can be seen that the only bolts needed for interconnecting the parts of the housing are those shown at 39, i.e. only four bolts. In the known version of the bearing housing shown in FIG. 2, these bolts are also needed to interconnect the bearing housing halves 3 and 4. However, in the illustrated and described version of the bearing housing according to the present invention, side gables are integrated with the rest of the bearing housing halves and thus does not require the additional 2×9 bolts used in the known housing to attach the side covers. As shown in FIG. 5, the bearing housing is further provided with four elongated bores 40 intended to take up four bolts for attaching the bearing housing to a support surface. As can be seen in FIG. 2, the prior known bearing housing is also provided with similar bores.

This means that the bearing housing shown in FIGS. 3–5 and described above has a substantially smaller number of components, thereby reducing the manufacturing costs and also the time required for mounting the bearing housing. At the same time, the resulting bearing housing is as well sealed off against the exterior as the prior known bearing housings, such as for instance the one described above and shown in FIGS. 1 and 2.

The method of mounting the bearing housing according to the present invention is as follows. The lower bearing half 23 is positioned on the support surface and attachment bolts are fitted through the bores 40, but are not tightened. The oil level gauge 38 is installed, preferably on the side of the bearing housing opposite to where the oil pick up ring 29 is located, and the maximum and minimum oil levels are indicated on the gauge.

The sleeve 24 forming the inner labyrinth ring is axially mounted on the shaft 1 and the oil pick up ring 29 is mounted axially on the sleeve 24. Thereupon the bearing 2 is mounted on the shaft 1 either directly on a stepped shaft or via an adapter sleeve.

Thereafter the outer labyrinth ring 30 is mounted axially on the inner labyrinth ring or sleeve 24, and the O-ring 35 is positioned on the outer end of the shank 34 of the outer labyrinth ring 30. If the bearing housing is to support a bearing having a shaft projecting out of both its gable openings, the same procedure is repeated on the opposite side of the bearing, but if not an end cover is inserted in the groove 32.

After these steps, and when it has been checked that the different parts of the seal assembly or seal assemblies are in the correct positions, the sleeve or inner labyrinth ring 24 is arrested against the shaft 1 by tightening set screws (see the set screws 12 in the version of the bearing housing shown in FIG. 1).

The shaft 1 with the bearing 2 and seal(s) mounted thereon is then laid (substantially radially) into the lower bearing housing half 23 so that the bearing 2 rests with its outer race ring against the seat in the lower bearing half. Thereupon the lower bearing housing half 23 is carefully aligned and the attachment bolts in the bores 40 are lightly tightened. Oil is then filled up in the bearing housing to the indicated maximum level.

Thereafter the surfaces of the two bearing housing halves 23, 22 are covered with an oil-resistant sealant, whereupon the upper half 22 is placed (radially) over the lower half 23, whereby the radially projecting shank 34 of the outer labyrinth ring 30 enters into the groove 33 in the upper housing half 23, thereby elastically deforming the sealing O-ring 35. The bolts 39 are inserted in their corresponding bores and are tightened to the recommended torque in order to join the upper and lower bearing housing halves. The bolts for attachment of the bearing housing to the supporting surface are then fully tightened.

It is preferable that the bearing housing halves are mounted to each other with the aid of known guiding pins for facilitating a correct positioning of the two bearing housing halves relative to each other.

It is thus evident that the time required for mounting the bearing housing according to the invention is substantially shorter that the time required for mounting the bearing housing described above and shown in FIGS. 1 and 2 as the mounting steps described above are similar in number to those required for the known bearing housing, but the known bearing housing requires the tightening of eighteen additional end cover bolts. The mounting of the labyrinth seal according to the new solution is relatively simple because this labyrinth seal has a separate L-shaped ring member 30 which can be relatively easily mounted by being pushed axially onto the sleeve 24 and then retained in a safe manner by being affixed in the groove 33 in the upper bearing half 22 when this half positioned on the lower housing half 23. The sealing effect is also quite good compared to that of the known bearing housing.

The principles, preferred embodiment and manner of assembly and operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A bearing housing split along a substantially horizontal plane and comprising an upper bearing housing half and a lower bearing housing half which have seat surfaces carrying a rolling bearing supporting a rotatable shaft, the upper bearing housing half having an inner surface and the lower bearing housing half having an inner surface, an oil reservoir space located in the lower bearing housing half, an oil pick up ring straddling the shaft so as to be partly located in the oil reservoir space and rotatable under influence of the rotatable shaft to transfer oil from the oil reservoir space to the bearing, an inner labyrinth sealing ring formed as a sleeve fitted around the shaft to follow rotation of the shaft, the sleeve being axially spaced apart from the bearing, the sleeve forming a circumferential axial groove having an open side facing away from the bearing, an outer labyrinth sealing part comprised of a ring member separate from the upper bearing housing half and the lower bearing housing half, the ring member having a first portion projecting axially into the axial groove to form a labyrinth seal with the axial groove and a second portion retained in a substantially radial circumferential groove formed in the inner surface of the upper bearing housing half, the upper bearing housing half and the lower bearing housing half both having gable wall openings fitting around the sleeve.

2. The bearing housing according to claim 1, wherein the radial, circumferential groove is formed also in at least a part of the inner surface of the lower bearing housing half.

3. The bearing housing according to claim 2, wherein the ring member has a substantially L-shaped cross-section with an axial shank forming the first portion of the ring member that projects into the axial groove in the sleeve and a substantially radial shank forming the second portion of the ring member that projects into and is retained in the groove in the inner surface of the upper bearing housing half, the axial shank being positioned at a distance from an outer surface of the sleeve to form a slot with the sleeve.

4. The bearing housing according to claim 3, comprising a resilient member positioned between an outer edge of the radial shank of the ring member and a bottom of the groove in the inner surface of the upper bearing housing half.

5. The bearing housing according to claim 4, wherein the resilient member is a resilient O-ring seal.

6. The bearing housing according to claim 5, wherein an outer surface of the sleeve is provided with a surface formation at a position axially outside the circumferential axial groove in the sleeve, the surface formation communicating with the oil reservoir space to drain oil leaking through the labyrinth seal to the oil reservoir space.

7. The bearing housing according to claim 1, wherein the ring member has a substantially L-shaped cross-section with an axial shank forming the first portion of the ring member that projects into the axial groove in the sleeve and a substantially radial shank forming the second portion of the ring member that projects into and is retained in the groove in the inner surface of the upper bearing housing half, the axial shank being positioned at a distance from an outer surface of the sleeve to form a slot with the sleeve.

8. The bearing housing according to claim 7, comprising a resilient member positioned between an outer edge of the radial shank of the ring member and a bottom of the groove in the inner surface of the upper bearing housing half.

9. The bearing housing according to claim 8, wherein the resilient member is a resilient O-ring seal.

10. The bearing housing according to claim 8, wherein an outer surface of the sleeve is provided with a surface formation at a position axially outside the circumferential axial groove in the sleeve, the surface formation communicating with the oil reservoir space to drain oil leaking through the labyrinth seal to the oil reservoir space.

11. The bearing housing according to claim 7, wherein an outer surface of the sleeve is provided with a surface formation at a position axially outside the circumferential axial groove in the sleeve, the surface formation communicating with the oil reservoir space to drain oil leaking through the labyrinth seal to the oil reservoir space.

12. The bearing housing according to claim 7, wherein an outer surface of the sleeve is provided with a surface formation at a position axially outside the circumferential axial groove in the sleeve, the surface formation communicating with the oil reservoir space to drain oil leaking through the labyrinth seal to the oil reservoir space.

13. A bearing housing comprising upper and lower bearing housing halves which mate with each other along a substantially horizontal plane, the upper and lower housing halves carrying a rolling bearing which supports a rotatable shaft, the upper and lower bearing housing halves each having an inner surface, an oil reservoir space located in the lower bearing housing half, an oil pick up ring at least partly located in the oil reservoir space and rotatable under influence of the shaft to transfer oil from the oil reservoir space to the bearing, a sleeve fitted around the shaft and configured to define a circumferential groove which opens axially in a direction away from the bearing, the upper and lower bearing housing halves each comprising side walls integrally formed in one piece with the respective upper and lower bearing housing half and fitted around the sleeve, a ring member separate from the upper and lower bearing housing halves, the ring member having a portion projecting into the circumferential groove to form a labyrinth seal with the circumferential groove.

14. The bearing housing according to claim 13, wherein an outer surface of the sleeve is provided with a surface formation at a position axially outside the circumferential axial groove in the sleeve, the surface formation communicating with the oil reservoir space to drain oil leaking through the labyrinth seal to the oil reservoir space.

15. The bearing housing according to claim 13, wherein the ring member has a substantially L-shaped cross-section comprised of a substantially axially extending shank forming the portion of the ring member that projects into the circumferential groove in the sleeve and a substantially radially extending shank forming the portion of the ring member that is retained in the groove in the inner surface of the upper bearing housing half.

16. The bearing housing according to claim 15, wherein the axially extending shank is positioned at a distance from an outer surface of the sleeve to form a slot with the sleeve.

17. The bearing housing according to claim 13, wherein a portion of the ring member is retained in a groove formed in the inner surface of the upper bearing housing half.

18. The bearing housing according to claim 17, wherein the portion of the ring member that is retained in the groove in the inner surface of the upper bearing housing half is a substantially radially extending shank, and comprising a resilient member positioned between an outer edge of the shank and a bottom of the groove in the inner surface of the upper bearing housing half.

19. The bearing housing according to claim 18, wherein the resilient member is an O-ring.

* * * * *